Feb. 25, 1964 R. L. CHACE 3,122,615
INTERLOCK MECHANISM FOR ENCLOSED SWITCHING APPARATUS
Filed July 26, 1960 3 Sheets-Sheet 1

Inventor:
Richard L. Chace,
by William D Roberson
Attorney.

Feb. 25, 1964 R. L. CHACE 3,122,615
INTERLOCK MECHANISM FOR ENCLOSED SWITCHING APPARATUS
Filed July 26, 1960 3 Sheets-Sheet 2
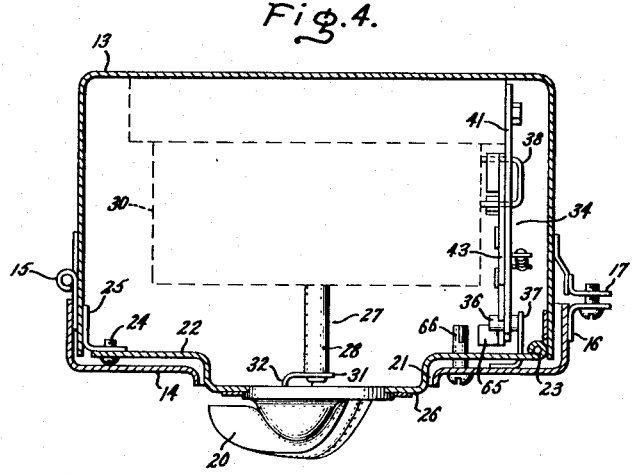
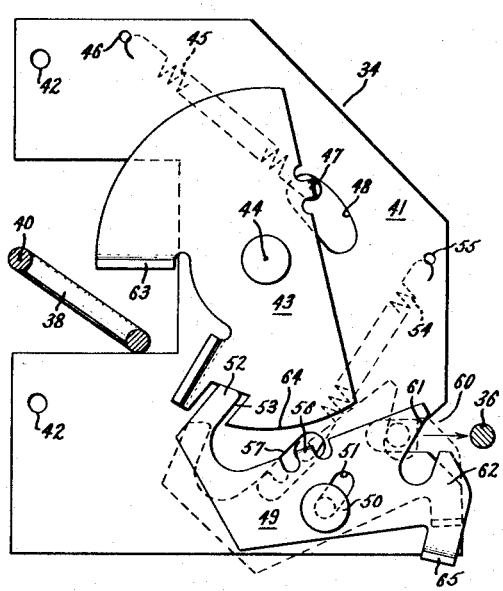
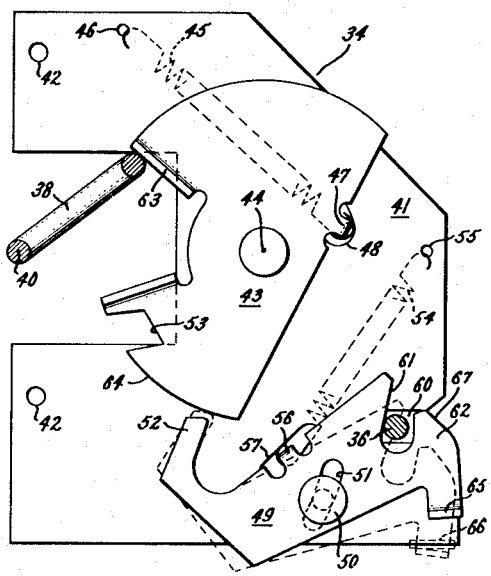
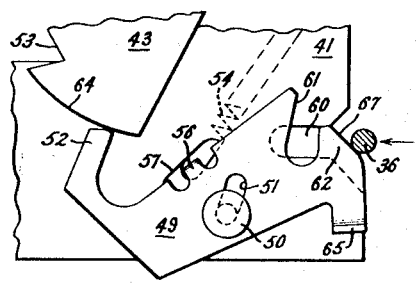
Inventor:
Richard L. Chace,
by William D Roberson
Attorney.

Feb. 25, 1964 — R. L. CHACE — 3,122,615
INTERLOCK MECHANISM FOR ENCLOSED SWITCHING APPARATUS
Filed July 26, 1960 — 3 Sheets-Sheet 3
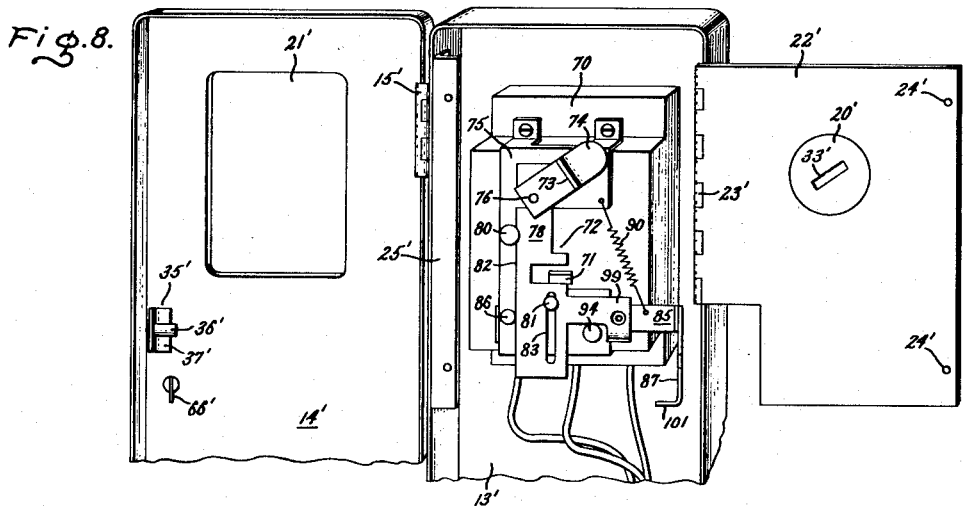
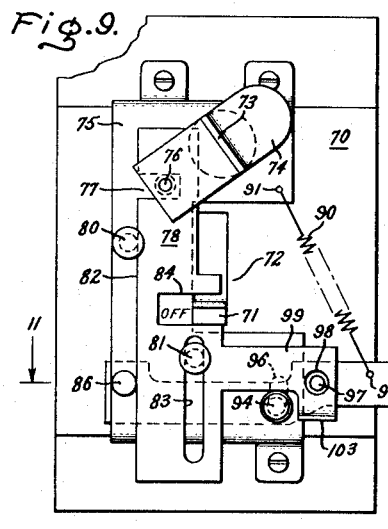
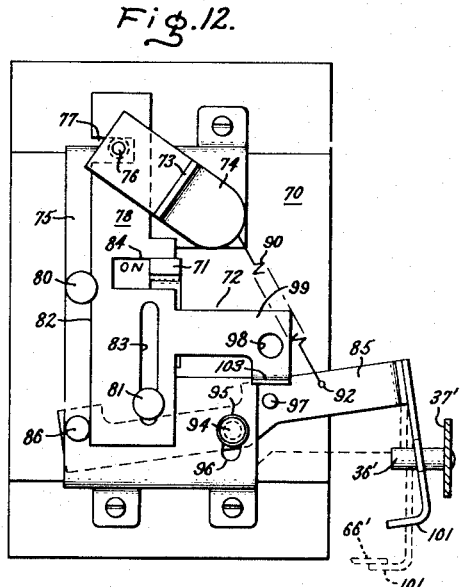
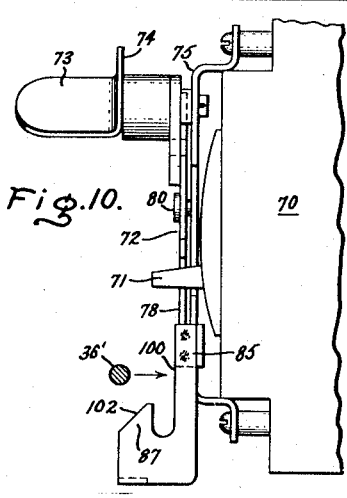
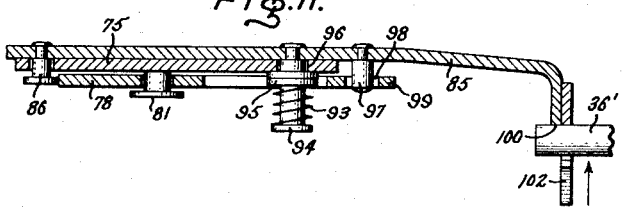
Inventor:
Richard L. Chace,
by William D Roberson
Attorney.

United States Patent Office 3,122,615
Patented Feb. 25, 1964

3,122,615
INTERLOCK MECHANISM FOR ENCLOSED
SWITCHING APPARATUS
Richard L. Chace, Bloomington, Ill., assignor to General
Electric Company, a corporation of New York
Filed July 26, 1960, Ser. No. 45,469
10 Claims. (Cl. 200—50)

This invention relates generally to circuit breakers, switches, or the like, and more particularly to interlock mechanisms for switching devices mounted within an enclosure having a cover which is openable for accessibility to the interior of the enclosure.

It is common practice to provide enclosures for electrical control equipment with locking and interlocking features to permit accessibility to the interior of the enclosure by skilled workmen when desired, but to prevent unauthorized or inadvertent entry into the enclosure by less skilled parties when the enclosed control elements are electrically energized and, hence, dangerous. In a very real sense, interlocked openable switch enclosures are intended to be foolproof. That is, they are intended to prevent the electrocution or injury of less knowledgeable persons who, unaware of the potential dangers, might expose themselves to energized electrical equipment. But although the foolish or ignorant are to be barred from opening such electrical enclosures when the parts within are energized, it is almost always desirable to permit skilled workmen aware of the hazards to open the enclosures for inspection and in-service repairs, even when the enclosed electrical control equipment is energized.

This, of course, means that the very features in the electrical control enclosure which are provided for safety purposes must be defeatable by one with the requisite knowledge. A defeat feasure is, however, by its very nature the antithesis of the interlock. As might be expected, the provision of such conflicting characteristics in a given physical installation is often inimical to the basic purposes of the design. In some examples the safety interlock function may be compromised in favor of accessibility. In others the safety interlock function may so completely dominate the design of the enclosure that it would require an Alexander to unravel the Gordian knot of its complicated mechanism. In either case the results can be dangerous. For example, it is not uncommon for the door of a control enclosure to be found standing partly open. If the enclosure happens to be of the type with the safety switch handle mounted in the cover, and the majority now seem to be built that way, then unless the door is securely closed a potential hazard exists. With such an arrangement, if the door is just slightly ajar, the switch handle may be completely separated from the switch and may no longer have any control over it even though the equipment within may be energized. On the other hand, if the interlock mechanism is too difficult or complicated to defeat, it may be found that the skilled workmen charged with the responsibility of maintaining the electrical equipment will have discovered a permanent way to defeat the interlock by twisting, cutting, pinching, or prying off a vital component necessary to the safety feature.

Attempts have been made from time to time to codify the standards and safety requirements of electrical control enclosures. One attempt at codification which has found current favor among various segments of the electrical industry would require (1) that the interlock between the switching device and the door of its enclosure should normally prevent operation of the switch to close its contacts when the door is open, (2) that it should be possible to defeat the interlock deliberately to close the switch contacts when the door is open, (3) that it should prevent closing of the switching device while the door is being closed until the door has been properly secured with fastening hardware, (4) that the interlock should not interfere with the proper closing of the door when the switching device is on, and (5) that the mechanical linkage between the switching device and its operating handle should be such that the handle remains in control of the device, even when the door of the enclosure is open.

It is a general object of this invention to provide in an enclosed switching apparatus an interlocking mechanism which fulfills these several functions, which is relatively uncomplicated, and which is compatible with existing types of switching devices and readily mountable therewith.

By way of a brief summary of a preferred embodiment of this invention, a control enclosure is provided having a switching device mounted therein and connected to control the energization of other electrical components such as a motor starter and the like mounted in the same enclosure. A twist handle for the switching device projects through an opening or window in the front cover door of the enclosure, the opening being large enough to clear the switch handle when the switching device is in its "on" or "off" positions. A safety interlocking mechanism within the enclosure is provided to interlock with the main cover door to provide the combination of safety and accessibility features outlined above. Principally, it includes a latching member mounted for a complex pivotal motion which pivots in one mode in response to actuation of the enclosed switching apparatus to latch and unlatch the cover door of the enclosure and pivots in another mode to provide certain defeat features.

Further details of the invention in its various aspects as well as additional objects and advantages are set forth in the following more detailed description taken in connection with the accompanying drawings, wherein:

FIGURE 4 is a cross-sectional view taken on line 4—4 of FIGURE 1 illustrating the relative orientation of parts when both the cover door and the sub-cover are closed;

FIGURE 5 is a plan view of a portion of the interlocking mechanism shown in FIGURES 2, 3 and 4 illustrating its operation when the switching device is off;

FIGURE 6 is a plan view similar to FIGURE 5 illustrating the operation of the interlocking mechanism when the switch is on;

FIGURE 7 is a partial view of the mechanism shown in FIGURE 6;

FIGURE 8 is a front view partially in perspective of an alternate type of enclosed switching apparatus including an alternate form of interlock mechanism constructed in accordance with this invention;

FIGURE 9 is an enlarged view of the interlocking mechanism shown in FIGURE 8 illustrating the relationship between parts when the operating handle of the switching device is in the "off" position;

FIGURE 10 is a side view of the interlocking mechanism shown in FIGURE 9;

FIGURE 11 is a cross-sectional view taken on lines 11—11 of FIGURE 9; and

FIGURE 12 is a front view of the interlocking mechanism shown in FIGURE 9 illustrating the relationship between parts when the operating handle of the switching device is in the "on" position.

The interlock mechanisms which are the subject of this invention are shown and described herein in combination with a control enclosure having a double door arrangement in which a main cover door hinged to one side of the enclosure closes over a partial sub-cover hinged to the other side of the enclosure, the sub-cover being openable and bearing thereon a disengageable switch handle. Certain details of the enclosed switching apparatus including the double door arrangement are not, however, of my invention, but are claimed in a separate copending application Serial Number 45,313, filed July 26, 1960, in the name of Robert A. Pusch. It should be understood that the interlock mechanisms disclosed herein are also useful in other types of enclosed switching apparatus.

Figure 1:
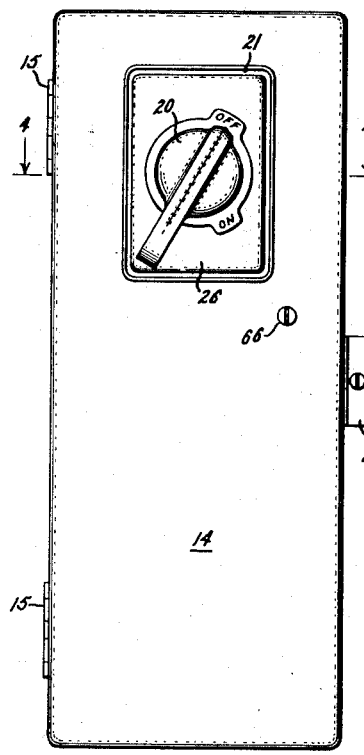
FIGURE 1 is a front view showing the cover door and switch handle of an enclosed switching apparatus to which may be applied an interlock mechanism constructed in accordance with the invention.
Figure 2:
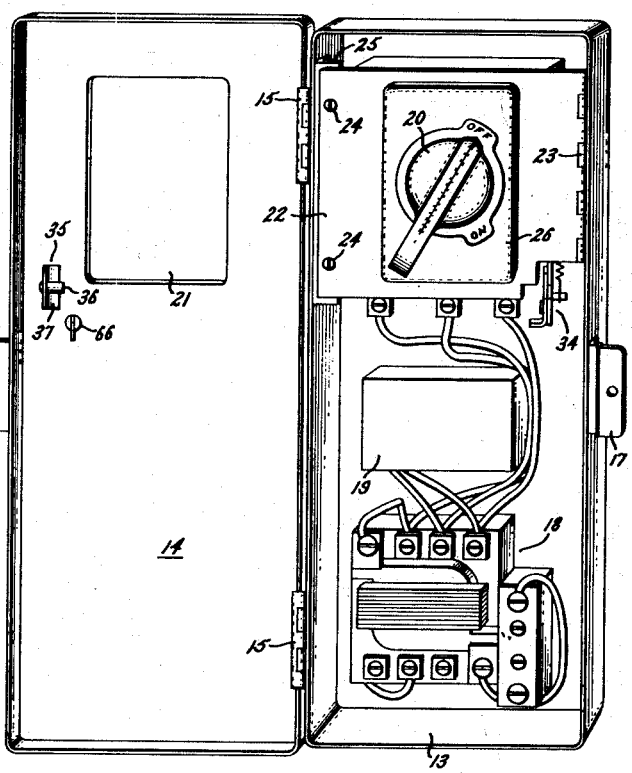
FIGURE 2 is a front view slightly in perspective of the enclosed switching apparatus shown in FIGURE 1 with the main cover door open showing part of the interlock mechanism.
Figure 3:
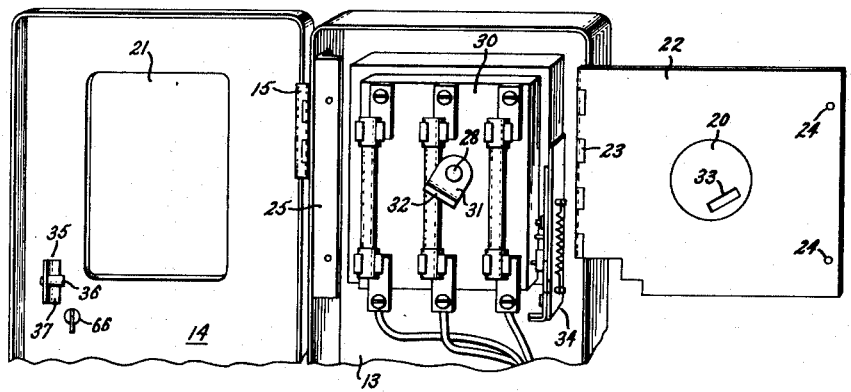
FIGURE 3 is a partial view of the apparatus shown in FIGURE 2 with both the main cover door and the sub-cover open.

With reference to the first illustrated embodiment of the invention and more particularly to FIGURES 1 through 4, an enclosure 13 is shown as being provided with a main cover door 14 attached by hinges 15 to the left hand side of the enclosure. Fastening means are provided on the enclosure and on the cover door in the form of cooperating projecting members 16 and 17 for fastening the door closed. Although these members are shown attached to each other by a screw in FIGURES 1 and 4 they may also be padlocked if desired. The projecting member 16 on the door may be grasped and used as a handle to open the main cover door thereby to expose to view the electrical control equipment within such as, for example, the electromagnetic contactor 18 and control transformer 19 with their associated electrical terminals and connections. When the main cover door is closed a switch handle 20 projects through the rectangular opening or window 21 formed in the door, the opening being large enough to clear the switch handle when it is in the off position, as shown in FIGURES 1 through 4, or in the on position.

Switch handle 20 is mounted on a sub-cover 22 fastened by a hinge 23 to the right hand side of enclosure 13 and by captive screws 24 to an angle iron 25 on the left hand side of the enclosure. When the main cover door is closed the center boss 26 on which the switch handle is located projects into the window 21 of the main cover door and fills the opening. When the main cover door is open, the captive screws 24 on the sub-cover are released, and the sub-cover is swung aside on its hinge, the switch handle 20 disengages from the switch operator 27. The switch operator 27 includes a twist rod 28 projecting from the front surface of a switching device 30, in this example a fused disconnect switch, and topped by an angled member 31 whose top projection 32 fits within a cooperating slot 33 in the undersurface of the switch handle. The switch handle and the switch operator may include interlocking features to prevent the sub-cover from being opened when the switch handle is in the on position. The handle interlocking arrangement employed is, however, not the subject matter of the present application and is not depicted in the drawings but may be in a form such as that disclosed in Patent 2,475,338, issued July 5, 1949, and assigned to the assignee of the present invention. It should be observed that when the sub-cover is open and the switch is in the off condition, in order for the switch handle 20 to engage properly with the switch operator 27 upon closing of the sub-cover, the switch handle must also be turned to the off position.

To provide the various safety interlocking and accessibility features with which the present application is concerned an interlock mechanism 34 is positioned beneath the sub-cover. Among the functions of the interlock mechanism 34 is the task of locking the cover door 14 against being opened when the switch is on. For this purpose the door carries a cooperating locking arrangement 35 shown in FIGURES 2 and 3 but best seen in FIGURE 4. The locking arrangement comprises a locking lug 36 suspended parallel to the plane of the cover door on the back surface thereof by an L-shaped plate 37 welded to the door. The effect of the interlock mechanism 34 upon the locking lug 36 is varied by the actuator 38 which actuates the internal contacts (not shown) of the switching device 30 and which is moved in response to rotation of the handle 20 by any suitable mechanism (not shown). The coaction between the actuator 38, the interlock mechanism 34, and the locking lug 36 is most clearly to be seen in FIGURES 5 through 7. In FIGURE 5 the contact actuator 38, which pivots about pivot point 40 adjacent the rear or base of the switching device, is shown in its off position in which its foremost part is pointed downward.

The principal components of the interlock mechanism are arranged on a mounting plate 41 affixed to the switching device at its base by threaded members which pass through apertures 42. A cam 43 pivoted at 44 on the mounting plate is urged into the position shown in FIGURE 5 by biasing spring 45 on the other side of the mounting plate fastened at one end to an aperture 46 in the mounting plate and at the other end to an outwardly turned lug 47 on the cam extending through slot 48 in the base plate. A latch member 49 is mounted for complex pivotal movement on journal 50 which passes through the elongated slot 51 in the latch member from the mounting plate to a headed end portion which holds the latch member captive to the base plate.

With the switch actuator in the off position and the cam 43 in the position shown in FIGURE 5, the latching member 49 is free to occupy the position shown in solid lines in that figure wherein a projecting cam follower 52 forming a portion of the latching member 49 extends into the recess 53 in the cam surface. The latching member is urged into this position by its biasing spring 54 affixed at one end to an aperture 55 in the mounting plate 41 and at the other end to an outwardly turned lug 56 which extends through an opening 57 in the mounting plate. The spring 54 exerts a constant bias on the latching member 49 tending to pivot it about journal 50 and to maintain the cam follower portion 52 in engagement with the cam 41. If the main cover door 14 is pushed closed, however, the locking lug 36 in entering slots 60 of the mounting plate will engage surface 61 of the latching member and force the latching member to the position shown in dotted lines in FIGURE 5. When this is done the hook portion 62 swings up behind the locking lug in a position to seal the exit of the lug from slot 60. As long as the cam 43 is in the position shown, however, the lug 36 is not locked in place, for if the door is opened the movement of the lug out of the slot simply permits the latching member to swing under the action of its biasing spring 54 back into the position shown in solid lines. Therefore although a coaction takes place between the interlock mechanism and the locking lug of the door, as long as the switch is off the door cannot be interlocked closed.

FIGURE 6 represents the orientation of the various elements shown in FIGURE 5 when the switch is on and the main cover door is closed. It can be seen in this figure that the switch contact actuator 38 has been pivoted upwardly about its pivot 40 and the extending arm of the actuator has engaged a surface 63 of cam 43 swinging it against the bias of spring 45 to a different position, such that the recess 53 in the surface of the cam is no longer opposite the cam follower 52. The hook 62 therefore blocks the exit of locking lug 36 and holds the main cover door closed when the switching device is on.

The interlock function thus provided can be defeated when on occasion it is desired to open the enclosure while the control equipment within is energized. The intentional defeat features provided for this purpose include the elongated slot 51 of the latching member, the projection 65 on the latching member adjacent the hook end, and a tool-operated lever 66 pivoted on the main cover door and operated from the front by a screwdriver or the like. When lever 66 is rotated clockwise it comes into engagement with the projection 65. Extra force applied upon engagement forces the hook end 62 of the latching member downward to clear the exit path of the locking lug. In pivoting downwardly this time the latching member swings about a point adjacent the cam follower end against the bias of spring 54. In this operation the elongation of the aperture 51 permits the necessary translatory motion of the latching member 49 with respect to the journal 50.

It has been seen that the interlock mechanism does not interfere with the opening and closing of the main cover door when the switch is off, that when the switch is on the door will be locked in the closed position, and that a simple defeat arrangement permits deliberate and intentional entry to the interior of the enclosure when the switch is on. Other features should also be noted. As seen in FIGURE 5, for example, when the switching device is off and the main cover door is open, the presence of cam follower 52 in slot 53 locks the cam 43 in the position shown. An inadvertent or unwise attempt to operate the switching device to its on position will fail, for surface 63 of the cam will prevent the forward end of the contact actuator 38 from moving upward into the contact closed position. This locking feature may also be defeated with a deliberate intent by pushing upwardly on hook end 62 of the latch member 49 to remove cam follower 52 from the slot 53. In this way a skilled workman will be able with the main cover door open to operate the switch to its on position thereby to observe whether the enclosed electrical control equipment is functioning properly. If this has been done, the interlock mechanism will then resemble in the orientation of its parts FIGURE 6, except that locking lug 36 will not occupy the slot 69. There will then be no impediment to turning the switching device off, for downward movement of the switch actuator 38 as seen in FIGURE 6 will simply be followed by movement of cam 43 under the urging of spring 45.

Once the defeat arrangement has been utilized to gain access to the interior of the enclosure with the switching device on, or if the defeat feature has been used to turn the switching device on while the main cover door is open, the door may again be closed without disturbing the operative condition of the switching device. For, as best seen in FIGURE 7, when the cover door is being closed the locking lock 36 engages a slanted cam-like surface 67 on the leading edge of the hook portion 62, thus forcing the latching member downwardly in the same manner that it was forced down by the defeat arrangement. When the locking lug 36 passes beyond the hook portion 62 the latching member is pulled upward once again by spring 54 to the position shown in FIGURE 7, locking the lug 36 within the slot 69.

An alternate embodiment of the invention is shown in FIGURES 8 through 12 in which those elements shared in common with the previous embodiment are identified by the same reference numerals with prime accents. It will be noted that the same general arrangement of the main cover door 14' and the sub-cover 22' on the enclosure 13' is possessed by the arrangement shown in FIGURE 8 as by that in the previous example. Indeed, when the sub-cover 22' and the main cover door 14' are closed and fastened, the external appearance of the enclosure is identical to that of FIGURE 1. The switching device in this second example is, instead of a disconnect switch with a twist operator, a molded case circuit breaker 70 having an operating lever 71 which in operation describes a vertical translatory movement along the front of the breaker. Mounted atop the circuit breaker is a combination mechanism 72 which converts the rotary motion of the switch handle 20' into the necessary translatory motion required to move operating lever 71 and which cooperates with the operating lever and cover door to provide certain interlocking features.

In FIGURE 8 the circuit breaker operating lever 71 and the switch handle 20' are shown in their off positions. When the sub-cover 22' is closed the slot 33' in the base of the switch handle fits over the elongated projecting portion 73 of operating member 74. Base member 75, mounted on the front of the circuit breaker, provides a support for the operating member, which is pivoted at a point immediately below the projecting portion 73. The operating member has a rivet 76 spaced from the pivot point and projecting from its lower surface to engage a cooperating slot 77 in slider 78. Rotation of the operating arm 74 by the switch handle effects a vertical translatory motion of the slider 78 which is guided in its course on base 75 by headed rivets 80 and 81 engaging guide surfaces 82 and 83 respectively on the slider. Because of the engagement of the circuit breaker operating lever 71 within a cooperating recess 84 of the slider 78, vertical movements of the slider occasion displacements of the operating lever 71 between its lower "off" position shown in FIGURE 9 and its upper "on" position shown in FIGURE 12.

With reference now to the interlock features provided, and particularly with regard to FIGURES 9, 10, and 11, it can be seen that there is carried on the underside of base 75 a latching member 85 pivotally mounted on one end by rivet 86 and carrying a hook portion 87 on its opposite end. The journal formed by rivet 86 is intentionally a loose one which permits a complex pivotal motion of latching member 85 with two degrees of rotational freedom. Thus, latching member 85 is capable of pivotal motion not only in a plane parallel to the front of circuit breaker 70 but also to a limited extent toward and away from the circuit breaker. Two springs bearing on the latching member 85 tend to urge it forward and upward. Spring 90 affixed at one end to an aperture 91 in base 75 and at its opposite end engaging an aperture 92 in the latching member 85 remote from the pivot point tends to urge the hook portion of the latching member in an upward direction as seen from the front of the unit. In addition, spring 93 carried on a headed post 94 projecting forward from the latching member 85 bears on a spring seat 95 resting on the front surface of base 75, thereby urging the latching member forward against base 75 as best seen in FIGURE 11. To permit up and down motion of the latching member parallel to the front surface of the breaker, the opening 96 in base 75 through which stud 94 projects is elongated in the direction of vertical pivotal motion of the latching member. However, the pin 97 on the front surface of the latching member in extending into the aperture 98 on the extended arm 99 of slider 78, inhibits the permissible vertical motion of the latching member. But pin 97 only engages in aperture 98 when the latching member is in the forward position shown in FIGURE 11.

In operation when the main cover door is closed locking lug 36' engages surface 100 of the latching member forcing it rearward in the direction of the arrows in FIGURES 10 and 11 against the bias of spring 93, thereby disengaging pin 97 from aperture 98. When the main cover door is shut, there is no impediment to the actuation of the switch handle 20' or of the operating lever 71 in either direction between their on and off positions. But when the slider occupies the lower position shown in FIGURE 9, the abutment between the extending arm 99 of the slider and spring seat 95 holds the latching member in its lower or unlatched position shown in FIGURE 9. Turning the circuit breaker on moves the slider 78 upward to the position shown in FIGURE 12 and permits the spring 90 to raise the latching member 85 to the latched position shown therein, the limits of its travel being established by the length of slot 96 in the base. This, then, is the basic interlocking action, for when the circuit breaker is off the latching member is in its lower or unlatched position, but when the circuit breaker is on the latching member raises into latched engagement with the locking lug 36'. Any inadvertent attempt to open the main cover door 14' when the circuit breaker is on and the enclosed electrical control equipment is energized and dangerous will therefore fail.

The interlock feature thus provided may also be intentionally defeated in substantially the same manner as in the previous example by rotating the tool-operated lever 66' until it comes into engagement with the extending projection 101 adjacent the hook end of the latching member forcing the hook down and disengaging it from locking lug 36'.

Just as the on condition of the circuit breaker interlocks the door to prevent its being inadvertently opened, so the open condition of the door prevents the circuit breaker from being inadvertently turned on. This characteristic comes about because of the location of pin 97 in aperture 98 when the latching member is not forced backward by the locking lug on the cover door. Because of the pin occupies aperture 98 at such times, any attempt to turn the circuit breaker on will meet with resistance when the latching member reaches the top of its travel as shown in FIGURE 12. The slider will then not be able to complete the upward travel necessary to turn the circuit breaker on. This safety interlock feature may also be defeated with deliberate intent by an intelligent workman who with one hand on the switch handle 20' employs his other hand to push the latching member 85 backward thereby disengaging pin 97 from aperture 98 and permitting the actuation of the circuit breaker by the continued upward travel of slider 78.

If an authorized workman has thus succeeded in turning the circuit breaker on with the main cover door open, he may at his option either close the main cover door on the equipment without disturbing the energized condition of the equipment, or he may again turn the circuit breaker off without first closing the cover door. When the circuit breaker is on as seen in FIGURE 12 and the main cover door is closed the latching lug 36' will engage the sloping front surface 102 of the hook portion and cam it downward until the hook can slip up behind the locking lug 36' and interlock the cover door closed. Or to turn the circuit breaker off with the cover door open the slider 78 will first move downward until a leading slanted edge 103 strikes pin 97 (see FIGURE 12) and carries the latching member to its lower unlatched position shown in dotted lines. When the latching member reaches this position the slanted leading edge 103 of the slide will then cam the pin 97 backward and away from base plate 75 until the pin snaps forward into aperture 98 when the slide has reached the lower limit of its travel.

Although but two specific embodiments of this invention have been described, it will be apparent to those skilled in the art to which the invention pertains that certain variations in the structures may be made without departing from these teachings. The appended claims are therefore intended to cover all such variations as fall within the true spirit and scope of this invention.

What I claim as new and desire to secure by Letters Patent of the United States is:

1. Enclosed switching apparatus comprising: an enclosure having a cover door hinged thereto; a switching device having a switch actuator mounted within said enclosure and actuable from the outside thereof between circuit open and circuit closed positions; and interlocking means cooperating with said switch actuator and said cover door, whereby normally the switch cannot be closed when said cover door is open and the cover door cannot be opened while the switch is closed, said interlocking means including an interlock member movable with said switch actuator between spaced positions corresponding to said circuit open and circuit closed positions of said switch actuator, a latch member having a latch portion for engagement with said cover door, means mounting said latch member for complex pivotal movement between limits about two distinct pivotal axes, spring means urging said latch member toward engagement with said interlock member, said interlock member and said latch member having surfaces engageable with each other to permit said latch member to assume a latched position with respect to said cover door under the urging of said spring means when said interlock member is in its position corresponding to said circuit closed position of said switch actuator and to restrain said latch member from assuming its latched position when said interlock member is in its position corresponding to said circuit open position of said switch actuator, means permitting actuation of said switching device when said cover door is closed including a cooperating surface on said latch member engaged by said door when said door is closed to force said latch member away from said interlock member about one of its pivotal axes against the bias of said spring means, means for defeating the interlocked relationship between said switching device and said cover door to permit said door to be opened when said switch actuating member is in said circuit closed position and said interlock member is in its positions corresponding to the circuit closed position of the switch actuator including means for rotating said latch member about its other pivotal axis against the bias of said spring means, and a cam surface on said latch member engaged by said door during closure thereof when said latch member is in a latching position corresponding to the circuit closed position of said actuating member to rotate said latch member to an unlatched position about said other axis for allowing closure of the door when said means for defeating is in normal condition without disturbing the circuit closed position of said actuating member.

2. Enclosed switching apparatus comprising: an enclosure having a cover door hinged thereto; a switching device within said enclosure including a switch actuator movable between circuit open and circuit closed positions; and interlocking means cooperating with said switch actuator nad said cover door, whereby the switch cannot normally be closed when said cover door is open and the cover door cannot normally be opened while the switch is closed, said interlocking means comprising an interlock member movable with said switch actuator between spaced positions corresponding to said circuit open and circuit closed positions of said switch actuator, a latch member having a latch portion for engagement with said cover door, means mounting said latch member for complex pivotal movement between limits about first and second distinct pivotal axes, spring means urging said latch member toward engagement with said interlock member about both axes, said interlock member and said latch member having surfaces engageable with each other to permit said latch member to assume a latched position with respect to said cover door under the urging of said spring means when said interlock member is in its position corresponding to said circuit closed position of said switch actuator and to restrain said latch member against assuming its latched position when said interlock member is in its position corresponding to said circuit open position of said switch actuator, said engageable surfaces including a projection on one of said members in alignment with a recess in the other of said members when said interlock member is in its circuit open position to lock said interlock member in position, means permitting actuation of said switching device when said cover door is closed including a cooperating surface on said latch member engaged by said door when said door is closed to force said latch member away from said interlock member about its first pivotal axis against the bias of said spring means thereby to withdraw said projection from said recess, means for defeating the interlocked relationship between said switching device and said cover door to permit said door to be opened when said switch actuator is in said circuit closed position and said interlock member is in its position corresponding to the circuit closed position of said switch actuator including means for rotating said latch member about its second pivotal axis against the bias of said spring means, and a cam surface on said latch member engaged by said door during closure thereof when said latch member is in a latching position corresponding to the circuit closed position of said switch actuator to rotate said latch member to an unlatched position about said second axis for allowing closure of the door when said means for defeating is in normal condition without disturbing the circuit closed position of said switch actuator.

3. Enclosed switching apparatus comprising: an enclosure having a hinged cover door; a switching device within said enclosure including a switch actuator movable between circuit open and circuit closed positions; and interlocking means cooperating with said switch actuator and said cover door including a pivotal interlock cam mounted within said enclosure having portions interengaging said switch actuator for rotation of said cam between spaced positions corresponding to said circuit open and circuit closed positions of said switch actuator, a latch member having a latch portion for engagement with said cover door and a cam follower lug, means mounting said latch member for complex pivotal motion between limits about first and second spaced-apart axes, the second of said axes being substantially at said cam follower lug, spring means acting on said latch member on a line extending between said pivotal axes in a direction to urge said cam follower lug toward engagement with said cam, said cam being formed about its periphery with a portion engageable with said cam follower lug for limiting movement of said latch member about its first pivotal axis when said cam is in its position corresponding to said circuit closed position of said switch actuator and with a recessed portion arranged to receive said lug to permit movement of said latch member about said first pivotal axis into locking engagement with said cam upon rotation of said cam to its position corresponding to said circuit open position of said switch actuator, said latch member being biased about its second axis toward latched engagement with said door when said cam is in its position corresponding to said circuit closed position of said switch actuator and being biased about its first axis toward unlatched engagement with said door when said cam is in its position corresponding to said circuit open position of said switch actuator with the recessed portion of said cam opposite said cam follower lug, means including a cooperative surface on said latch member engaged by said door when said cam is in its position corresponding to the circuit open position of said switch actuator for driving said latch member about its first axis into latched position thereby retracting said cam follower lug from said recessed portion to permit switch actuating movement of said switch actuating member, and means for defeating the latching operation of said latch member to permit said door to be opened when said switch actuating member is in its circuit closed position and said cam is in its position corresponding to said circuit closed position of said switch actuator including means for rotating said latch member about its second axis to an unlatched position against the bias of said spring means.

4. Enclosed switching apparatus comprising: an enclosure having a hinged cover door; a switching device within said enclosure including a switch actuator movable between circuit open and circuit closed positions; and interlocking means cooperating with said switch actuator and said cover door including a pivotal cam mounted within said enclosure having portions interengaging said switch actuator for rotation of said cam with said actuator between spaced positions corresponding to said circuit open and circuit closed positions of said switch actuator, a latch member having a latch portion for engagement with said cover door and a cam follower lug, means mounting said latch member adjacent said cam for complex pivotal motion between limits about first and second spaced-apart axes, the second of said axes being substantially at said cam follower lug, spring means acting on said latch member on a line extending between said pivotal axes in a direction to urge said cam follower lug toward engagement with said cam, said cam being formed about its periphery with a portion engageable with said cam follower lug for limiting movement of said latch member about its first pivotal axis when said cam is in its position corresponding to said circuit closed position of said switch actuator and with a recessed portion arranged to receive said lug upon rotation of said cam to its position corresponding to said circuit open position of said switch actuator to permit movement of said latch member about said first pivotal axis thereby locking said cam against rotation, said latch member being biased about its second axis by said spring means toward latched engagement with said door when said cam is in its position corresponding to said circuit closed position of said switch actuator and being biased about its first axis by said spring means toward unlatched engagement with said door when said cam is in its position corresponding to said circuit open position of said switch actuator with the recessed portion of said cam opposite said cam follower lug, means including a cooperative surface on said latch member engaged by said door when said cam is in the position corresponding to said circuit open position of said switch actuator for driving said latch member about its first axis into latched position thereby retracting said cam follower lug from said recessed portion to permit switch actuating movement of said switch actuating member, and means for defeating the latching operation of said latch member to permit said door to be opened when said switch actuating member is in said circuit closed position and said cam is in its position corresponding to the circuit closed position of said switch actuator including means for rotating said latch member about its second axis to an unlatched position against the bias of said spring means.

5. Enclosed switching apparatus comprising: an enclosure having a cover door hinged thereto; a switching device within said enclosure including a switch actuator movable between circuit open and circuit closed positions; and interlocking means cooperating with said switch actuator and said cover door, whereby the switch cannot normally be closed when said cover door is open and the cover door cannot normally be opened while the switch is closed, said interlocking means comprising an interlock member movable with said switch actuator between spaced positions coresponding to said circuit open and circuit closed positions of said switch actuator, a latch member mounted adjacent said interlock member and having a latch portion for engagement with said cover door, means mounting said latch member for complex pivotal movement between limits about first and second mutually orthogonal axes, spring means urging said latch member toward engagement with said interlock member about both of its axes, said interlock member having surfaces engageable with surfaces of said latch member to permit said latch member to assume a latched position with respect to said cover door under the urging of said spring means when said interlock member is in its position corresponding to said circuit closed position of said switch actuator and to restrain said latch member against assuming its latched position when said interlock member is in its position corresponding to said circuit open position of said switch actuator, said engageable surfaces including a projection on one of said members extending in alignment with a recess in the other of said members when said interlock member is in its circuit closed position and being urged therein by said spring means, means permitting actuation of said switching device when said cover door is closed including a cooperating surface on said latch member engaged by said door when said door is closed to force said latch member away from said interlock member about its second pivotal axis against the bias of said spring means to withdraw said projection from said recess, and means for defeating the interlocked relationship between said switching device and said cover door to permit said door to be opened when said switch actuator is in its circuit closed position and said interlock member is in its position corresponding to the circuit closed position of the switch actuator including means for rotating said latch member about its first axis against the bias of said spring means.

6. Enclosed switching apparatus comprising: an enclosure having a cover door hinged thereto; a switching device within said enclosure including a switch actuator movable between circuit open and circuit closed positions; and interlocking means cooperating with said switch actuator and said cover door, whereby the switch cannot normally be closed when said cover door is open and the cover door cannot normally be opened while the switch is closed, said interlocking means comprising an interlock member movable with said switch actuator between spaced positions corresponding to said circuit open and circuit closed positions of said switch actuator, a latch member mounted adjacent said interlock member and having a latch portion for engagement with said cover door, means mounting said latch member for complex pivotal movement between limits about first and second mutually orthogonal axes, spring means urging said latch member toward engagement with said interlock member and into a latched position with respect to said cover door about its first axis, said interlock member having surfaces engageable with surfaces of said latch member upon movement of said interlock member from its position corresponding to the circuit closed position of said switch actuator to its position corresponding to the circuit open position of said switch actuator to drive said latch member against the bias of said spring means into its unlatched position; said engageable surfaces including a projection on one of said members extending parallel to the first of said axes in alignment with a recess in the other of said members when said interlock member is in its position corresponding to said circuit closed position of said switch actuator for locking engagement therewith, means permitting actuation of said switching device when said cover door is closed including a cooperating surface on said latch member engaged by said door when said door is closed to force said latch member away from said interlock member about its second pivotal axis against the bias of said spring means to withdraw said projection from said recess, and means for defeating the interlocked relationship between said switching device and said cover door to permit said door to be opened when said switch actuator is in its circuit closed position and said interlock member is in its position corresponding to said circuit closed position of the switch actuator including means for rotating said latch member about its first axis against the bias of said spring means away from its latched position.

7. Enclosed switching apparatus comprising: an enclosure having a cover door hinged thereto; a switching device having a switch actuator mounted within said enclosure and actuable from the outside thereof between circuit open and circuit closed positions; and interlocking means cooperating with said switch actuator and said cover door, whereby normally the switch cannot be closed when said cover door is open and the cover door cannot be opened while the switch is closed, said interlocking means including an interlock member movable with said switch actuator between spaced positions corresponding to said circuit open and circuit closed positions of said switch actuator, a latch member having a latch portion for engagement with said cover door, means mounting said latch member for complex pivotal movement between limits about two distinct pivotal axes, spring means urging said latch member toward engagement with said interlock member, said interlock member and said latch member having surfaces engageable with each other to permit said latch member to assume a latched position with respect to said cover door under the urging of said spring means when said interlock member is in its position corresponding to said circuit closed position of said switch actuator and to restrain said latch member from assuming its latched position when said interlock member is in its position corresponding to said circuit open position of said switch actuator, means permitting actuation of said switching device when said cover door is closed including a cooperating surface on said latch member engaged by said door when said door is closed to force said latch member away from said interlock member about one of its pivotal axes against the bias of said spring means, and means for defeating the interlocked relationship between said switching device and said cover door to permit said door to be opened when said switch actuating member is in the circuit closed position and said interlock member is in its position corresponding to the circuit closed position of the actuating member, said last-named means including a lever mounted on the door for pivotal movement about an axis extending generally perpendicular to one of the pivotal axes of said latch member for rotating said latch member to an unlatched position when the door is closed.

8. Enclosed switching apparatus comprising: an enclosure having a cover door hinged thereto; a switching device having a switch actuator mounted within said enclosure and actuable from the outside thereof between circuit open and circuit closed positions; and interlocking means cooperating with said switch actuator and said cover door, whereby normally the switch cannot be closed when said cover door is open and the cover door cannot be opened while the switch is closed, said interlocking means including an interlock member movable with said switch actuator between spaced positions corresponding to said circuit open and circuit closed positions of said switch actuator, a latch member having a latch portion for engagement with said cover door, means mounting said latch member for complex pivotal movement between limits about two distinct pivotal axes, spring means urging said latch member toward engagement with said interlock member, said interlock member and said latch member having surfaces engageable with each other to permit said latch member to assume a latched position with respect to said cover door under the urging of said spring means when said interlock member is in its position corresponding to said circuit closed position of said switch actuator and to restrain said latch member from assuming its latched position when said interlock member is in its position corresponding to said circuit open position of said switch actuator, means permitting actuation of said switching device when said cover door is closed including a cooperating surface on said latch member engaged by said door when said door is closed to force said latch member away from said interlock member about one of its pivotal axes against the bias of said spring means, means for defeating the interlocked relationship between said switching device and said cover door to permit said door to be opened when said switch actuating member is in the circuit closed position and said interlock member is in its position corresponding to the circuit closed position of the actuating member, said last-named means including a lever mounted on the door for pivotal movement about an axis extending generally perpendicular to one of the pivotal axes of said latch member for rotating said latch member to an unlatched position when the door is closed, and a cam surface on said latch member different from said cooperating surface engaged by said door during closure thereof when said latch member is in a latching position corresponding to the circuit closed position of said actuating member to rotate said latch member to an unlatched position about said other axis for allowing closure of the door when said defeating mechanism is in normal condition without disturbing the circuit closed position of said actuating member.

9. Enclosed switching apparatus comprising: an enclosure having a hinged cover door; a switching device within said enclosure including a switch actuator movable between circuit open and circuit closed position; and interlocking means cooperating with said switch actuator and said cover door including a pivotal cam mounted within said enclosure having portions interengaging said switch actuator for rotation of said cam with said actuator between spaced positions corresponding to said circuit open and circuit closed positions of said switch actuator, a latch member having a latch portion for engagement with said cover door and a cam follower lug, means mounting said latch member adjacent said cam for complex pivotal motion between limits about first and second spaced-apart axes, the second of said axes being substantially at said cam follower lug, spring means acting on said latch member on a line extending between said pivotal axes in a direction to urge said cam follower lug toward engagement with said cam, said cam being formed about its periphery with a portion engageable with said cam follower lug for limiting movement of said latch member about its first pivotal axis when said cam is in its position corresponding to said circuit closed position of said switch actuator and with a recessed portion arranged to receive said lug upon rotation of said cam to its position of said switch actuator to permit movement of said latch member about said first pivotal axis thereby locking said cam against rotation, said latch member being biased about its second axis by said spring means toward latched engagement with said door when said cam is in its position corresponding to said circuit closed position of said switch actuator and being biased about its first axis by said spring means toward unlatched engagement with said door when said cam is in its position corresponding to said circuit open position of said switch actuator with the recessed portion of said cam opposite said cam follower lug, means including a cooperative surface on said latch member engaged by said door when said cam is in its position corresponding to said circuit open position of said switch actuator for driving said latch member about its first axis into latched position thereby retracting said cam follower lug from said recessed portion to permit switch actuating movement of said switch actuating member, means for defeating the latching operation of said latch member to permit said door to be opened when said switch actuating member is in said circuit closed position and said cam is in its position corresponding to the circuit closed position of said switch actuator including means for rotating said latch member about its second axis to an unlatched position against the bias of said spring means, and a cam surface on said latch member different from said cooperating surface engaged by said door during closure thereof when said latch member is in a latching position corresponding to the circuit closed position of said actuating member to rotate said latch member to an unlatched position about said other axis for allowing closure of the door when said means for defeating is in normal condition without disturbing the circuit closed position of said actuating member.

10. Enclosed switching apparatus comprising: an enclosure having a cover door hinged thereto; a switching device within said enclosure including a switch actuator movable between circuit open and circuit closed positions; and interlocking means cooperating with said switch actuator and said cover door, whereby the switch cannot normally be closed when said cover door is open and the cover door cannot normally be opened while the switch is closed, said interlocking means comprising an interlock member movable with said switch actuator between spaced positions corresponding to said circuit open and circuit closed positions of said switch actuator, a latch member mounted adjacent said interlock member and having a latch portion for engagement with said cover door, means mounting said latch member for complex pivotal movement between limits about first and second mutually orthogonal axes, spring means urging said latch member toward engagement with said interlock member and into a latch position with respect to said cover door about its first axis, said interlock member having surfaces engageable with surfaces of said latch member upon movement of said interlock member from its position corresponding to the circuit closed position of said switch actuator to its position corresponding to the circuit open position of said switch actuator to drive said latch member against the bias of said spring means into its unlatched position; said engageable surfaces including a projection on one of said members extending parallel to the first of said axes in alignment with a recess in the other of said members when said interlock member is in its position corresponding to said circuit closed position of said switch actuator for locking engagement therewith, means permitting actuation of said switching device when said cover door is closed including a cooperating surface on said latch member engaged by said door when said door is closed to force said latch member away from said interlock member about its second pivotal axis against the bias of said spring means to withdraw said projection from said recess, and means for defeating the interlocked relationship between said switching device and said cover door to permit said door to be opened when said switch actuator is in its circuit closed position and said interlock member is in its position corresponding to said circuit closed position of the switch actuator including means for rotating said latch member about its first axis against the bias of said spring means away from its latched position, said interlock member being mounted for movement in opposite directions along an axis generally perpendicular to said first axis and generally parallel to said second axis.

References Cited in the file of this patent
UNITED STATES PATENTS 1,310,163    Knudsen  ---------------- July 15, 1919
1,568,042    Broadwell  ---------------- Jan. 5, 1926